May 17, 1938.     L. S. ANKER     2,117,932
VEHICLE SEAT
Filed Nov. 18, 1936
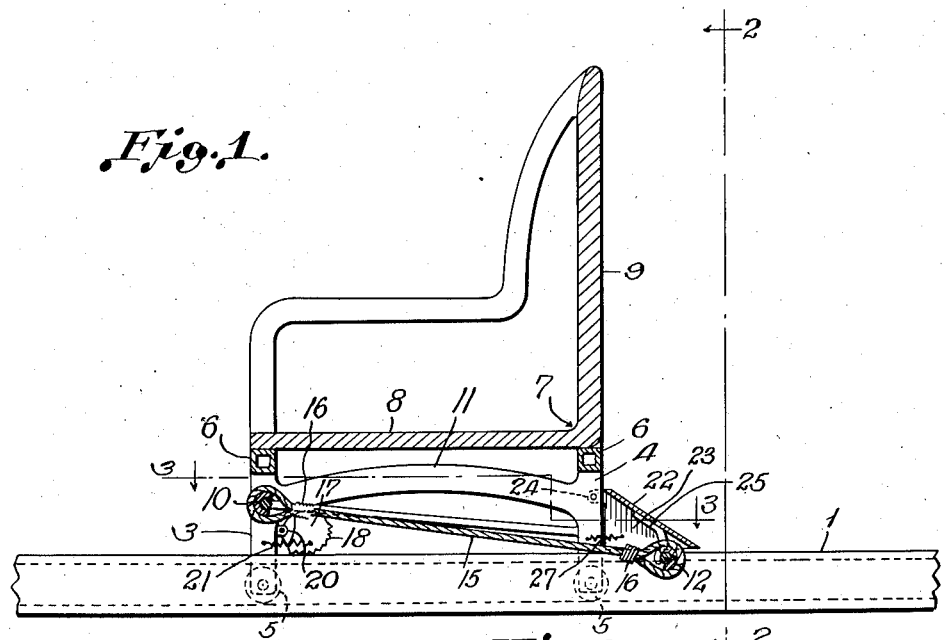
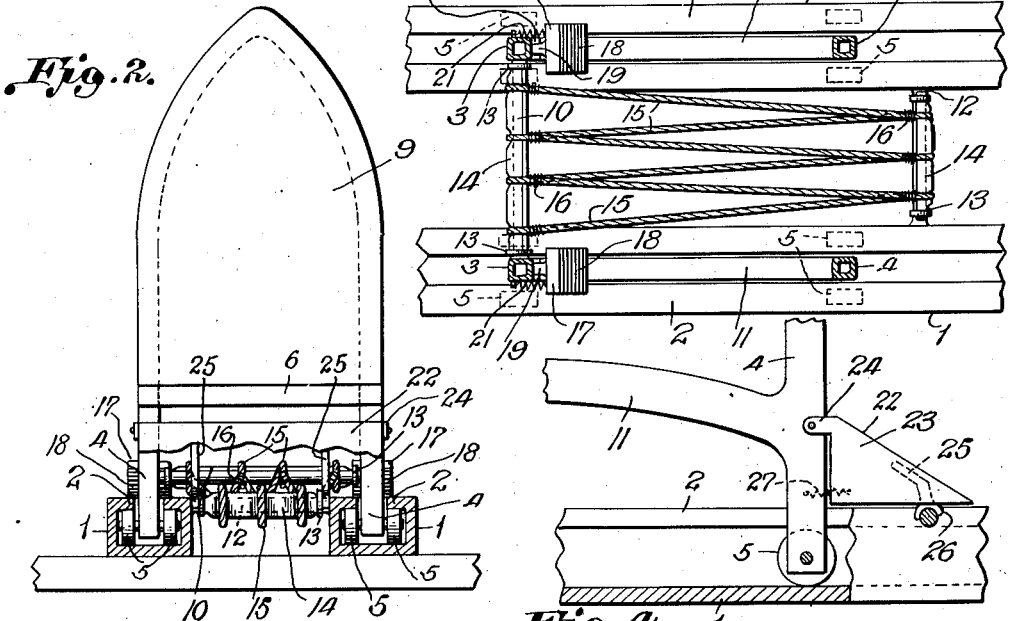
Lloyd S. Anker
INVENTOR
BY Victor J. Evans & Co.
ATTORNEYS Patented May 17, 1938

2,117,932

UNITED STATES PATENT OFFICE 2,117,932

VEHICLE SEAT

Lloyd S. Anker, Cambridge, Ohio

Application November 18, 1936, Serial No. 111,528

5 Claims. (Cl. 155—9)

This invention relates to vehicle seats and its general object is to provide a seat that is primarily designed for use in passenger airplanes and the like to relieve the shock imparted to the occupants, caused when making a bad landing or in the event of a crash or crackup, thereby preventing or reducing injury to a minimum in that the seat is mounted for movement but is restrained or checked during its movement and brought to a gradual stop within a short space, thereby preventing the occupant from being thrown from the seat or jolted about therein.

A further object of the invention is to provide a seat of the character set forth, that is simple in construction, inexpensive to manufacture, easy to install in numbers and extremely efficient in use, operation and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a vertical sectional view taken through the seat which forms the subject matter of the present invention and illustrating the same in applied position.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 is a fragmentary detail view illustrating the rear portion of the seat and its application to a track, with parts in section and in elevation.

Referring to the drawing in detail, the reference numeral 1 indicates a pair of tracks, and while only one seat and one pair of tracks are shown, it will be obvious that in regular passenger carrying planes two pair of tracks will be installed which are preferably fastened to the cross struts of the plane. Any number of seats are mounted on the tracks, it depending of course upon the size of the plane, as will be apparent.

The tracks as best shown in Figure 2 are of the channel type and include overhanging horizontal spaced flanges 2 between which are passed the forward and rear legs 3 and 4 respectively, the legs having stub axles fixed to the lower ends thereof and upon which are journaled rollers 5 arranged in pairs and mounted upon the base of the rails as clearly shown in Figure 2.

The legs preferably form a part of a tubular base frame of the seat which includes cross pieces 6 that have welded or otherwise secured thereto the body 7 of the seat, the body including a seat portion 8 and a back 9 which together with the seat portion and the sides are preferably formed into a single unit, as suggested in Figure 1. It will be obvious that the body of the seat may be upholstered and provided with suitable cushions and any means may be employed for attaching a safety belt to the body.

Bridging the front or forward legs 3 is what I term an anchor bar 10 which may be suitably reinforced and for that purpose, I have illustrated the use of substantially bow shaped braces 11 that are formed on or otherwise secured to the bar 10, and have the rear ends thereof formed on or otherwise secured to the rear legs 4, as shown in Figures 1 and 4.

Cooperating with the anchor bar 10 is a bar 12 which bridges and is fixed at its ends to the inner side of the tracks, it being obvious that a bar 12 is provided for each seat, and the bars 12 are disposed at equi-distantly spaced relation along the tracks.

The bars 10 and 12 have fixed thereto by bands 13 or other appropriate means, cover members 14 which are substantially co-extensive with the length of the bars and cover the outer sides thereof, as best shown in Figure 3. The cover members have grooves arranged therein to act as seats for the looped end portions of an elastic cord 15, the latter having one end fixed to the bar 10 about the cover member thereof and is thence looped about the bars, with its opposite end likewise fixed to the bar 12 and about the cover member thereof. The looped portions of the cord adjacent to the bars are secured together as at 16.

Cooperating with the elastic cord which of course acts in the capacity as a shock absorber, are snubbers 17 in the form of cams having rounded faces provided with teeth 18 extending transversely thereof, and the snubbers include reduced portions 19 which are pivotally secured to and between ears 20 formed on or otherwise fixed to the rear portions of the front legs, as best shown in Figures 1 and 3, and in a manner whereby the teeth 18 normally rest upon the flanges of the tracks, and are held accordingly by coil springs 21, the latter having one of their ends fixed to the snubbers and the opposite ends to the front legs.

I likewise provide a foot rest it being obvious that the foot rest is designed for the occupant of the seat to the rear of the one shown, and the foot rest not only acts as such, but also to hold the seat against casual movement, as well as a cover, in that it includes a flat upper wall 22 having side walls 23 secured thereto, and the side walls have ears 24 formed thereon adjacent the upper ends, the ears being pivotally secured to the inner sides of the rear legs, for securing the foot rest to the seat accordingly, as will be apparent upon inspection of Figure 4, which likewise illustrates the fact that the upper wall is disposed at an inclination to provide a convenient rest. Secured to the under surface of the upper wall is a pair of bracket members 25 that terminate at their lower ends in semi-circular members 26 to fittingly engage the bar 12, therefore it will be obvious that the foot rest prevents casual movement of the seat and the brackets are held accordingly by coil springs 27, the latter having one of their ends secured to the side walls and their opposite ends to the rear legs.

From the above description and disclosure of the drawing, it will be obvious that I have provided a seat that is mounted for movement, and is primarily designed for use in passenger airplanes or the like, but of course can be used in any type of vehicle. In any event if a vehicle equipped with my seats should be suddenly stopped, the bracket members 25 would become disengaged from the bar 12 and the seat would be moved forwardly on the tracks, but of course the movement would be checked or restrained by the action of the cord or cords 15, as well as by the snubbers 17, and brought to a gradual stop, thereby preventing the occupant from being thrown from the seat and becoming injured.

While I have illustrated and described elastic cords and tracks of a certain type, it will of course be understood that coil springs or other suitable resilient means can be used in place of the cord or cords, and tracks of any kind suitable for the purpose may be employed.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A seat comprising a body including a seat portion and a back, a base carrying the body, rollers on the base tracks for the rollers, stretchable resilient means having one end fixed to the base and its opposite end anchored to limit movement of the seat on the tracks, and toothed snubbing means pivotally mounted on the base and engaged with the tracks for cooperation with the resilient means to check and gradually stop movement of the seat.

2. A seat comprising a body including a seat portion and a back, a base carrying the body and including legs, rollers journaled on the lower ends of the base for movement of the seat thereon, tracks having the rollers mounted thereon, a bar bridging the front legs, stretchable resilient means having one of their ends secured to the bar and the opposite ends anchored to limit movement of the seat with respect to the tracks, and toothed snubbing means pivotally mounted on the front legs and engaged with the tracks for cooperation with the resilient means to check and gradually stop movement of the seat.

3. A seat comprising a body including a seat portion and a back, a base carrying the body and including front and rear legs, rollers on the lower ends of the legs, tracks having the rollers mounted therein for movement of the seat along the tracks, a bar bridging the front legs, stretchable resilient means having one end fixed to the bar and the opposite end anchored to limit movement of the seat, toothed snubbing means pivotally secured to the front legs and engageable with the tracks for cooperation with the resilient means to check and gradually stop movement of the seat.

4. A seat comprising a body including a seat portion and a back, a base carrying the body and including front and rear legs, rollers journaled to the lower ends of the legs, tracks receiving the rollers for movement of the seat with respect thereto, a cross bar bridging the front legs, a cross bar bridging the tracks, stretchable resilient means having the ends thereof fixed to the cross bars to limit the movement of the seat, snubbing means pivotally secured to the front legs and engageable with the tracks for cooperation with the resilient means to check and gradually stop movement of the seat, and a foot rest pivotally secured to the base, and engageable with the cross bar of the tracks to normally hold the seat against movement.

5. A seat comprising a body including a seat portion and a back, a base carrying the body and including front and rear legs, rollers journaled on the lower ends of each of the legs, a pair of channel tracks having the rollers mounted therein for movement of the seat with respect thereto, a cross bar bridging the front legs, a cross bar bridging the tracks, a resilient cord fixed to and looped about the cross bars to limit movement of the seat, cover means on the cross bars and being grooved to provide seats for the looped portions of the cord, snubbing means pivotally secured to the front legs and including teeth, spring means for holding the toothed portions of the snubbing means in engagement with the tracks to cooperate with the resilient cord to check and gradually stop movement of the seat, a foot rest in the form of a cover and pivotally secured to the base, and brackets secured to the foot rest and engageable with the bar of the track to normally hold the seat against movement.

LLOYD S. ANKER.